Oct. 27, 1942.    R. S. A. DAUGHERTY ET AL    2,300,351
TRANSMISSION TOWER STRUCTURE
Original Filed Jan. 25, 1938    4 Sheets-Sheet 1

Inventors
Robert S. A. Dougherty
Clark L. White, and
By R. S. A. Dougherty
Attorney

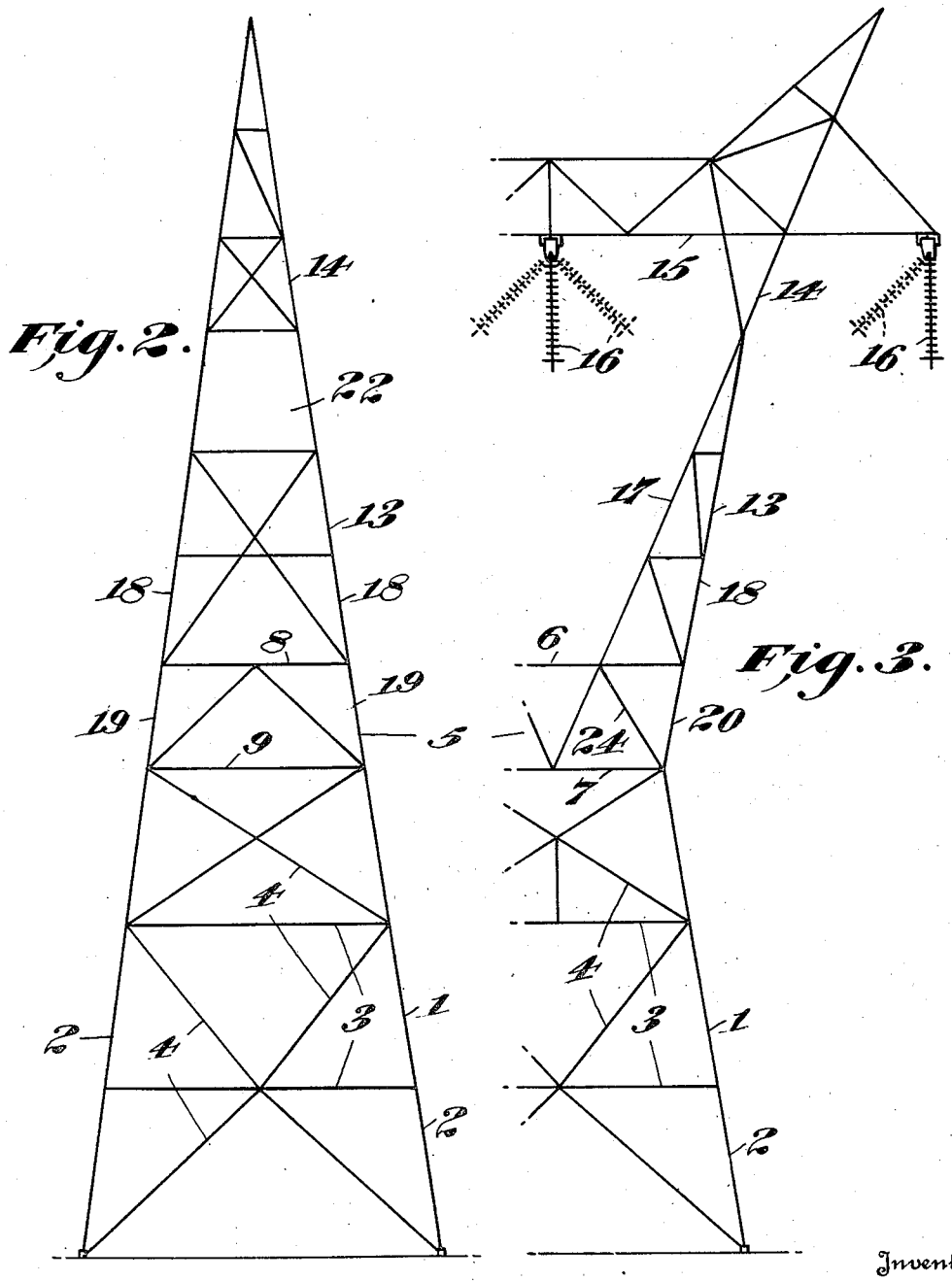

Oct. 27, 1942. R. S. A. DAUGHERTY ET AL 2,300,351
TRANSMISSION TOWER STRUCTURE
Original Filed Jan. 25, 1938 4 Sheets-Sheet 3

Inventors
Robert S. A. Daugherty
Clark L. White, and
By R. S. A. Daugherty
Attorney Oct. 27, 1942.  R. S. A. DAUGHERTY ET AL  2,300,351
TRANSMISSION TOWER STRUCTURE
Original Filed Jan. 25, 1938  4 Sheets-Sheet 4
*Fig. 12.*
Old Art.
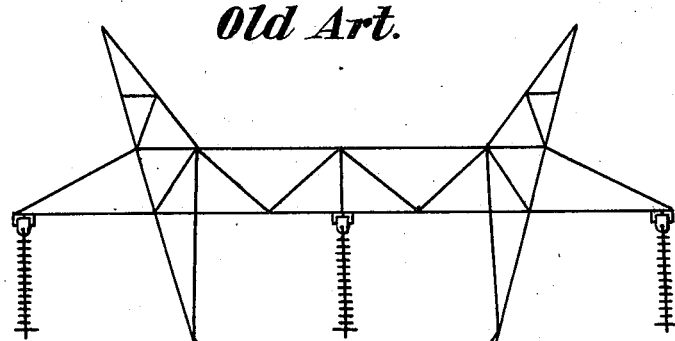
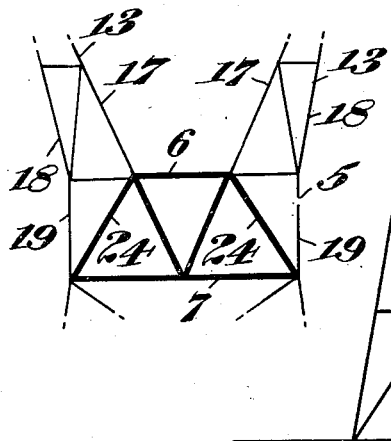
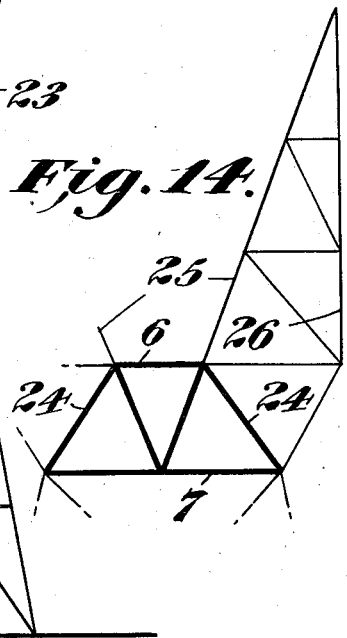
Inventors
Robert S. A. Dougherty
Clark L. White, and
By R. S. A. Dougherty
Attorney Patented Oct. 27, 1942

2,300,351

UNITED STATES PATENT OFFICE 2,300,351

TRANSMISSION TOWER STRUCTURE

Robert S. A. Dougherty and Clark L. White, Bethlehem, Pa., assignors to Bethlehem Steel Company, a corporation of Pennsylvania Application January 25, 1938, Serial No. 186,782
Renewed March 19, 1940

16 Claims. (Cl. 189—22)

This invention relates generally to transmission towers for supporting electric conductors of a three-phase circuit carrying high voltages and two static wires, which are built up of rigid material such as structural steel shapes bolted or otherwise secured together to form the tower. Such towers, supporting conductors and static wires which necessarily traverse the open country for long distances, must be therefore strong and reliable, as well as light of weight and economical to manufacture.

Towers for this purpose are subjected to severe strains caused by the wind pressure on the wires and to angles in the lines which throw strains upon the cross-arms normal thereto; to the breakage of one of the transmission wires on one side of the tower while the others remain unbroken thereby causing longitudinal forces to be applied at right angles to the cross-arms at either end or at the middle thereof or at all three points along the cross-arm, and to the dead weight of the wires and of the ice coatings formed thereon in wintertime.

Our invention relates more particularly to a single circuit waist suspension tower designed to more equally distribute the load on the tower body especially when excessive longitudinal forces are received thereby caused by the breakage of one or more of the wires. Heretofore towers of this type have been built of rolled steel angles or the like in which the longitudinal forces caused by the breakage of one or more of the wires are carried down from the cross-arm to the legs of the tower through corner rails and shear bracing placed in the exterior faces of the upwardly tapered, outwardly diverging supporting arms of the tower, which extend in a straight line from the cross-arm plane down to the waist line. In this manner the longitudinal forces are carried from the cross-arm down the exterior face of the upwardly tapered, outwardly diverging supporting arms to the waist, and the reactions there resolved into their horizontal and vertical components, resulting in the vertical components following directly over the one leg of the tower. This vertical component being directly over one leg can not through sound engineering principles be distributed in any manner except downward through the single leg above which the load is concentrated.

In our invention the longitudinal forces from the cross-arms are carried down to the waist through the inner corner rails and shear bracing in the interior faces of the tower arms extending in a straight line from the cross-arm plane down to the center line of the tower where the center line intersects the bottom chord of the waist in the transverse faces of the tower, and are distributed equally into the different parts of the tower below the waist.

This distribution of the vertical component at the waist of the longitudinal forces equally into two longitudinal faces can be accomplished without the central portion of the top chord of the waist truss feature as indicated in Fig. 1 and Fig. 3, but results in increased weight of the tower, as the corner rails above the waist will have additional stress as well as the top and bottom chord members of the cross-arm section of the tower.

By using a few additional members to constitute the trusses of the waist the stresses are reduced in the top and bottom chords of the cross-arm section and the exterior corner posts or rails above the waist, the additional members constituting the truss being shorter and carrying the same loads with smaller cross sectional area than would be required additionally in the chords of the cross-arm section and the exterior corner posts or rails. This truss scheme then results in a lighter tower.

Having thus given a general description of the objects of our invention we will now in order to make the same more clear refer to the four sheets of drawings forming a part of this specification, in which we have indicated diagrammatically by single lines the lengths of material of which the tower is built:

Fig. 2 is a side elevation of the transmission tower illustrated in Fig. 1;

Fig. 3 is a front elevation of slightly more than half of a transmission tower, showing a modified form of construction;

Figure 1:
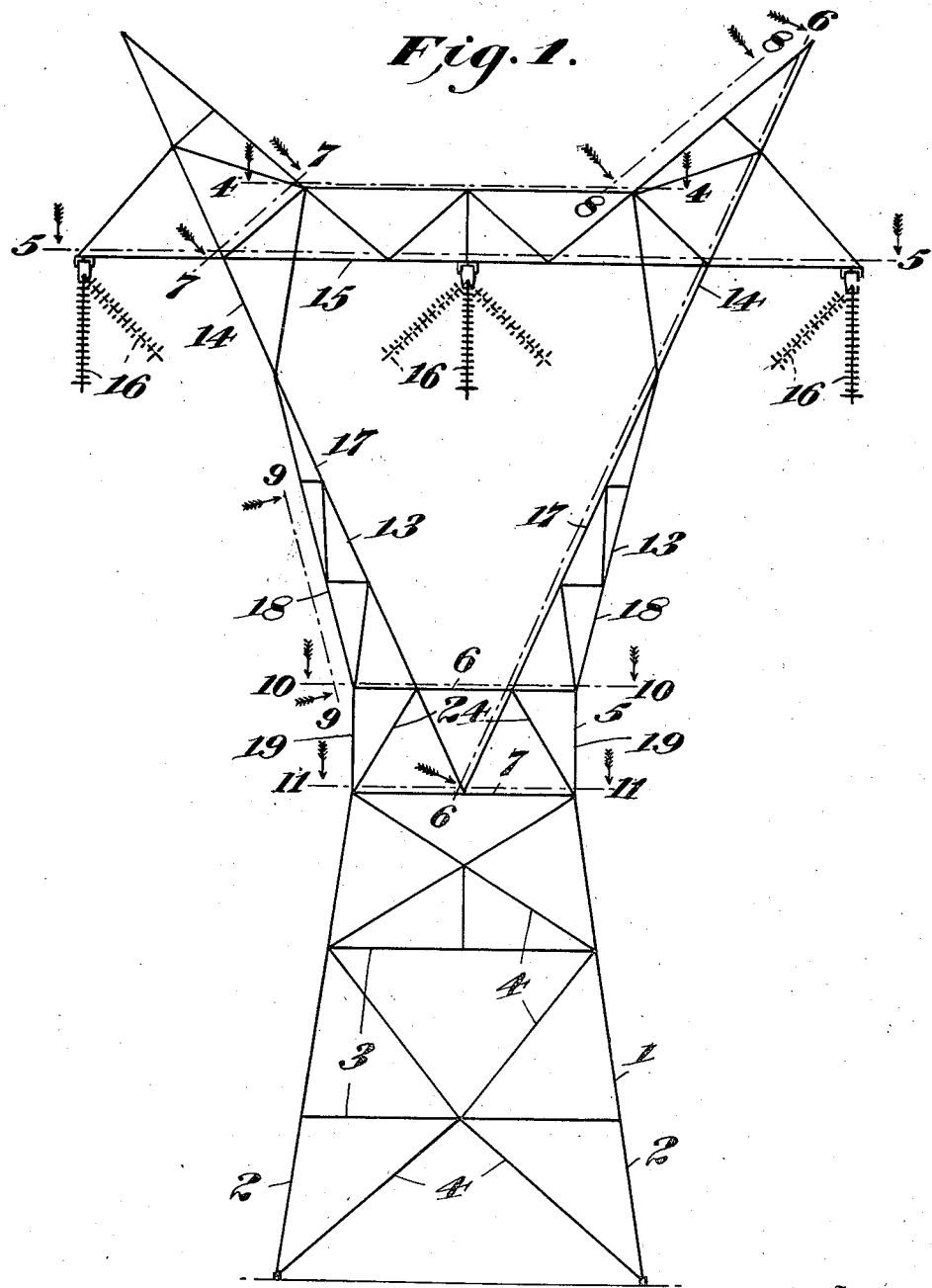
Figure 1 is a front elevation of a transmission tower embodying our invention.
Figure 4:
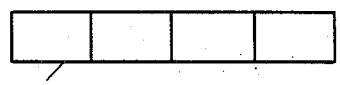
Fig. 4 is a horizontal section view showing the upper chord member of the cross-arm as indicated on the line 4—4 of Fig. 1.
Figure 5:
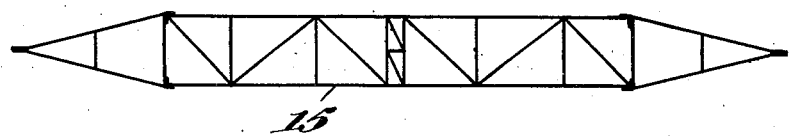
Fig. 5 is a horizontal section through the cross-arm as indicated on the line 5—5 of Fig. 1.
Figure 10:
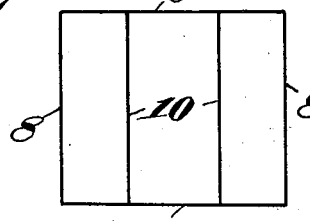
Figure 11:
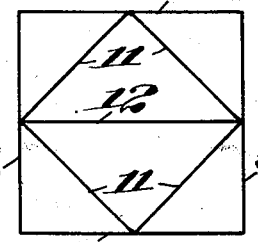

Figs. 10 and 11 are transverse section views taken just above the top and bottom chords of the waist of the tower on the lines 10—10 and 11—11, respectively, of Fig. 1;

Fig. 12 is a front elevation view of a tower in which the longitudinal forces are carried from the cross-arm down the exterior faces of the upwardly tapering, outwardly diverging supporting arms to the waist;

Fig. 13 is a detail view showing more clearly in heavy lines one of the waist trusses in the transverse faces of the tower for distributing the stresses from the tower arms equally into the different parts of the tower below the waist; and Fig. 14 is a detail view showing another modified form of construction for one of the tower arms.

Referring now to the various characters of reference on the drawings, and first to Figs. 1 to 11, the lower portion 1 of the transmission tower is in the form of a truncated pyramid having corner rails or legs 2 connected together by means of suitable horizontal and diagonal braces 3 and 4, respectively.

The lower portion 1 at the top has an upwardly extending waist 5 of substantially rectangular shape in cross section having top and bottom chords 6 and 7 at opposite faces of the tower and top and bottom chords 8 and 9 at the sides, respectively, which are connected together by means of diagonal braces adapted to form side trusses for the sides of the waist. The top chords 6 at the opposite faces of the tower are connected together by means of the members 10, while the bottom chords 7 and 9 are connected by means of diagonal braces 11 and tie member 12. The tower arms 13 are duplicates and extend from opposite sides of the center line of the waist and are upwardly tapering and outwardly diverging members each provided with a truss formation 14 at its upper end adapted to support a cross-arm 15 from which the insulators 16 are suspended in accordance with the usual practice. The lower ends of the inner corner rails 17 for each of the tower arms are secured centrally to the bottom chords 7 of the waist from which point they extend upwardly and outwardly until their upper ends converge and are secured together at the tops of the trusses 14 above the cross-arm 15. The outer corner members for the tower arms 13 are formed by means of rails 18 which may have their lower ends connected to the tops of the legs 2 at the outer corner base line of the waist, or formed as a deflected continuation of the same, and their upper ends secured to the inner corner rails 17 at the lower ends of the trusses 14.

In Fig. 1 the lower ends 19 of the rails 18 at the waist are bent as illustrated to extend vertically while in Fig. 3 this portion of the member 18 at the waist is shown as inclined as at 20 to extend in a straight line from the base line of the waist to the lower ends of the trusses 14. The corner rails 17 and 18 are connected together by means of diagonal and transverse braces as indicated.

The base of each tower arm is in the longitudinal direction in which the sustained electric conductors extend equal in length to the upper edge of the truncated pyramidal base portion of the tower body and the lower edge of the waist portion, and the breadth of the base of the arm is preferably half that of the lower edge of the waist, with the combined bases of the two arms equal in extent and coincident with the base of the waist and top of truncated base portion 1 of the tower. By this construction of the tower arms the inner corner rails 17 extend in the same inclined plane from the tops of the trusses 14 above the cross-arm 15 down to the center of the waist. In this manner the major portion of the longitudinal forces exerted on the cross-arm are carried down to the waist through the inner corner rails 17 and the shear bracing 21 in the interior faces of the tower arms in a straight line from the tops of the trusses 14 and cross-arm 15 down to the center line of the tower where the center line intersects the bottom chords 7 of the waist on opposite faces of the tower. In this manner the vertical component of the reactions from the longitudinal load at the center of the tower can be distributed substantially equally into the two longitudinal faces of the tower.

Figure 6:
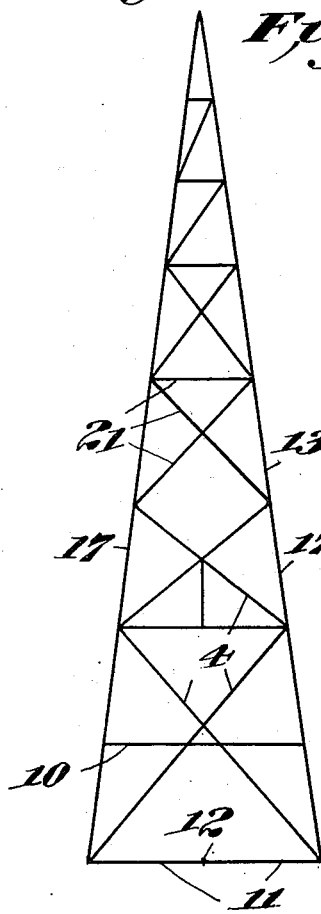
Fig. 6 is a section view taken on the line 6—6 of Fig. 1, showing the inner face of one of the upwardly tapering, outwardly diverging supporting members and waist.
Figures 7, 8:
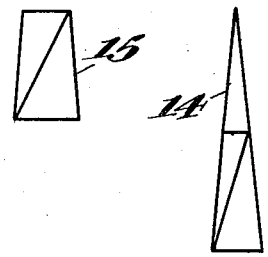
Fig. 7 is a section view through one end portion of the cross-arm taken on the line 7—7 of Fig. 1.
Fig. 8 is a plan view of the upper inner portion of one of the trusses as indicated by the line 8—8 of Fig. 1.
Figure 9:
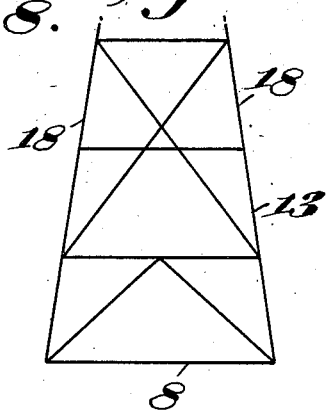
Fig. 9 is an elevation of the outside of the lower portion of one of the upwardly tapering, outwardly diverging supporting arms indicated at 9—9 on Fig. 1.

It will be noted that in order to further assist in controlling the path of the shear we have placed the necessary shear bracing in the interior faces of the arms as indicated in Fig. 6 and have omitted one panel of bracing in each of the exterior sides of the tower arms as indicated at 22 in Fig. 2.

In Fig. 12 we have illustrated the usual manner of constructing transmission towers of the waist type in which the longitudinal forces are carried down the exterior faces of the tower arms 23 each in a straight line to the waist, and there resolved into horizontal and vertical components, resulting in the vertical components following directly over one leg of the tower. This vertical component being directly over one leg is distributed downwardly through the single leg above which the load is concentrated, and not in the center of the tower as shown and described in our invention.

In Figs. 13 and 14 we have shown the trusses in the transverse faces of the waist in heavy lines, the top and bottom chords 6 and 7 having their ends connected by means of end posts 24. Fig. 14 also shows a tower arm 25 which has a vertically extending exterior face 26.

It will be understood that the waist is subjected to both shear and torsion, assuming only one ground wire or one conductor on one side of the tower is broken, the torsional or longitudinal forces carried down from the cross-arm to the waist will put the top chord on one face of the tower under compression, while the top chord on the opposite face of the tower will be placed under tension. In this manner the longitudinal load vertical component at the center of the tower can be distributed equally into the longitudinal faces of the tower.

Although we have shown and described our invention in considerable detail, we do not wish to be limited to the exact and specific details shown and described, but may use such substitutions, modifications or equivalents thereof, as are embraced within the scope of our invention or as pointed out in the claims.

Having thus described our invention what we claim as new and desire to secure by Letters Patent is:

1. A transmission tower for supporting wires comprising a lower portion of truncated pyramidal formation having corner legs, a waist at the top of the said lower portion having top and bottom chords connected by diagonal braces, upwardly tapering outwardly diverging tower arms extending above each side of the waist, a cross-arm supported by the tower arms, said tower arms having inner corner rails connected by shear bracing forming the interior face of each of the upwardly tapering outwardly diverging tower arms, said inner corner rails extending in a straight line from the transverse central portion of the bottom chords of the waist between the corner legs of the lower portion to the cross-arm for transmitting the major portion of the longitudinal forces received by the cross-arm from the wires in a straight line down to the said transverse central portion of the bottom chords of the waist.

2. A transmission tower comprising a lower portion of truncated pyramidal formation having corner legs, a waist at the top of the said lower portion having top and bottom chords connected by trusses, upwardly tapering outwardly diverging tower arms extending above each side of the waist, a cross-arm supported by the tower arms, inner corner rails connected by shear bracing forming the interior face of each of the upwardly tapering outwardly diverging tower arms, said inner corner rails and shear bracing extending in a straight line from the cross-arm down to the center line of the tower between the corner legs of the lower portion where it intersects the bottom chords of the transverse faces of the waist.

3. A transmission tower for supporting wires comprising a lower portion of truncated pyramidal formation having corner legs, a waist at the top of the lower portion having a plurality of trusses with top and bottom chords, upwardly tapering outwardly diverging tower arms extending above each side of the waist, a cross-arm supported by the tower arms, said tower arms having inner corner rails connected by shear bracing forming the interior face of each of the upwardly tapering outwardly diverging tower arms, said inner corner rails extending in a straight line from the cross-arm to the transverse central bottom chords of the waist trusses between the corner legs for transmitting the major portion of the longitudinal forces received by the cross-arm from the wires in a straight line from the cross-arm to the transverse central lower portion of the waist.

4. A transmission tower for supporting wires comprising an upright tapering base portion, a trussed waist structure at the top of said base portion having top and bottom chords, diverging tower arms extending upwardly from each side of the waist, a cross-arm supported by the tower arms, said tower arms having inner corner rails and shear bracing extending from the cross-arm to the central portion of the bottom chords of the waist for transmitting the major portion of the longitudinal forces received by the cross-arm from the wires down the interior faces of the tower arms to the central portion of the bottom chords of the waist.

5. A transmission tower for supporting wires comprising an upright tapering base portion, a waist formed with a plurality of trusses having top and bottom chords at the top of said base portion, diverging tower arms extending upwardly from each side of the waist, a cross-arm supported by the tower arms, said tower arms having inner corner rails and shear bracing extending from the cross-arm to the central portion of the bottom chords of the waist for transmitting the major portion of the longitudinal forces received by the cross-arm from the wires down to the central lower portion of the bottom chords of the waist and distributing it equally into the two longitudinal faces of the tower.

6. A transmission tower comprising an upright tapering base portion, a trussed waist structure having top and bottom chords on the top of the base portion, diverging wedge shaped tower arms having inner corner rails extending upwardly from each side of the waist, trusses extending from the top of each tower arm, a cross-arm supported by the trusses and tower arms, the inner corner rails of the tower arms connecting the central portion of the bottom chords with the outer ends of the top chords adapted to form the diagonal braces for the waist trusses, said inner corner rails extending continuously in the same inclined plane from the central portion of the bottom chords of the waist to the tops of the trusses above the cross-arm.

7. A transmission tower comprising an upright tapering base portion, a waist having top and bottom chords connected by diagonal braces on the top of the base portion, said diagonal braces extending from the outer ends of the top chords to the central portion of the bottom chords, and posts connecting the ends of the top and bottom chords of the waist trusses together, diverging wedge shaped tower arms extending upwardly from each side of the waist, truss extensions for each tower arm, a cross-arm supported by the truss extensions, and corner rails forming a part of the inner face of each tower arm and the outer face of each truss extension extending continuously in the same vertically inclined plane from the intermediate portion of the bottom chords of the waist to the tops of the truss extensions.

8. A transmission tower comprising a lower body portion of truncated pyramidal shape, a waist on the top of the lower body portion having top and bottom chords, diagonal braces and corner posts for connecting the top and bottom chords, digerging wedge shaped tower arms extending upwardly from each side of the waist having inner and outer corner rails, truss extensions for each tower arm, a cross-arm supported by the truss extensions, said side corner rails at the inner faces of the tower arms each being secured and extending in a straight line from the center line of the lower chord of the waist to the top of the truss extensions for supporting the cross-arm.

9. A transmission tower comprising an upright tapering base portion, a waist on the top of the base portion having a truss on opposite transverse faces, top and bottom chord members for the trusses, end posts connecting the ends of the top and bottom chord members of the waist, diverging wedge shaped tower arms extending upwardly from each side of the waist having inner and outer corner rails, a truss extending above the upper end of each tower arm, a cross-arm supported by the trusses at the upper end of the tower arms, said inner corner rails of the tower arms extending continuously in the same vertically inclined plane from the central portion of the bottom chords of the waist trusses on the opposite transverse faces of the tower to the top of the trusses for supporting the cross-arms.

10. A transmission tower comprising an upwardly tapering lower portion having corner legs, a waist at the top of the tapered lower portion having a truss in the opposite transverse faces, top and bottom chord members for the waist trusses, end posts connecting the ends of the top and bottom chord members of the waist trusses, diverging wedge shaped tower arms having inner and outer corner rails extending from each side of the waist, a truss extension for the upper end of each tower arm, a cross-arm supported by the truss extensions at the upper end of the tower arms, said inner corner rails of the tower arms extending in a straight line from the cross-arm plane down to the center of the bottom chords of the waist trusses in the transverse faces of the tower, and a rail connection between each of the tops of the corner legs and the inner corner rails at the lower ends of the truss extensions.

11. A transmission tower comprising a lower portion of truncated pyramidal formation, a waist at the top of the said lower portion having a truss with top and bottom chords in opposite transverse faces of the tower, upwardly tapering outwardly diverging tower arms extending from each side of the waist having inner and outer corner rails, a truss extension for each tower arm, a cross-arm supported by the truss extensions, said inner corner rails of each of the tower arms extending in a straight line from the center of the bottom chords of the waist trusses in each of the transverse faces of the tower to the upper end of the truss extensions above the tower arms and connected together at the top, and end posts for the waist trusses each having its upper end secured to the end of a top chord and an inner corner rail for the tower arms and its lower end secured to the outer end of the bottom chord of one of the waist trusses.

12. A transmission tower comprising a lower portion of truncated pyramidal formation having corner legs, a waist at the top of the said lower portion having a truss with top and bottom chords in opposite transverse faces of the tower, upwardly tapering outwardly diverging tower arms extending from each side of the waist having inner and outer corner rails, a truss extension for each tower arm, a cross-arm supported by the truss extensions, said inner corner rails of each of the tower arms extending in a straight line from the center of the bottom chords of the waist trusses in each of the transverse faces of the tower to the upper end of the truss extensions above the tower arms and connected together at the top, end posts for the waist trusses each having its upper end secured to the end of a top chord and an inner corner rail of the tower arms and its lower end secured to the outer end of the bottom chord of one of the waist trusses, outer corner rails for the tower arms connecting the upper ends of the legs of the lower truncated pyramidal portion of the tower with the lower ends of the truss extensions of the tower arms, shear bracing panels connecting the outer corner rails, and a blank panel at the upper end of the exterior face of each tower arm below the truss extensions.

13. A transmission tower for supporting wires comprising a main lower portion of truncated pyramidal formation, a trussed waist structure having top and bottom chord members mounted on top of the said main lower portion, tower arms extending upwardly and outwardly from the waist and the main truncated pyramidal lower portion, a cross-arm supported by the tower arms adapted to receive longitudinal forces from the wires, and corner rails and shear bracing forming the interior faces of the tower arms extending from the cross-arm to the central portion of the bottom chords of the waist adapted to form the diagonal braces for the waist trusses and receive the major portion of said longitudinal forces and distribute them equally into the different parts of the main lower portion of the tower.

14. A transmission tower for supporting wires comprising a main lower portion of truncated pyramidal formation, a waist having a truss in the opposite transverse faces of the tower, each of said waist trusses having a top and bottom chord member, corner posts connecting the ends of the top and bottom chords of the trusses together, upwardly tapering outwardly diverging tower arms extending from opposite sides of the waist, a cross-arm supported by the tower arms adapted to receive vertical, transverse and longitudinal forces from the wires, and corner rails and shear bracing forming the interior faces of the tower arms extending in a straight line from the cross-arm down to the central lower portions of the waist trusses adapted to connect the ends of the top chords and upper ends of the end posts with the central portion of the bottom chords to form diagonal braces for the waist trusses and receive the major portion of said forces from the cross-arm and distribute them equally into the different parts of the main lower portion of the tower.

15. A transmission tower for supporting wires comprising a main lower portion of truncated pyramidal formation, a waist having a truss in each of the opposite transverse faces of the tower, upwardly tapering outwardly diverging tower arms extending from opposite sides of the waist, a cross-arm supported by the tower arms adapted to receive the longitudinal forces from the wires, and corner rails and shear bracing forming the interior faces of the tower arms extending in a straight line from the cross-arm down to the base of the central portions of the waist trusses, said waist trusses adapted to receive said longitudinal forces from the cross-arm transmitted down the inner faces of the tower arms and distribute them equally into the different parts of the main lower portion of the tower.

16. A transmission tower for supporting wires comprising an upright tapering base portion having corner legs, a waist at the top of said base portion having top and bottom chords connected by trusses, upwardly and outwardly diverging wedge shaped tower arms on said base portion each having inner and outer corner rails connected by shear bracing, a truss extension secured to the upper end of each tower arm, a cross-arm supported by said truss extensions, the inner corner rails and shear bracing of said tower arms extending in a straight line from the cross-arm to the central portion of the bottom chords of the waist and adapted to transmit the major portion of the longitudinal forces received by said cross-arm from the wires to the center of the bottom chord members of the waist between the corner legs of the base portion of the tower.

ROBERT S. A. DOUGHERTY.
CLARK L. WHITE.